(12) United States Patent
Shan et al.

(10) Patent No.: US 11,645,769 B2
(45) Date of Patent: May 9, 2023

(54) PAVEMENT MACROTEXTURE DETERMINATION USING MULTI-VIEW SMARTPHONE IMAGES

(71) Applicant: Purdue Research Foundation, West Lafayette, IN (US)

(72) Inventors: Jie Shan, West Lafayette, IN (US); Xiangxi Tian, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 276 days.

(21) Appl. No.: 17/201,051

(22) Filed: Mar. 15, 2021

(65) Prior Publication Data
US 2021/0287383 A1 Sep. 16, 2021

Related U.S. Application Data

(60) Provisional application No. 62/989,670, filed on Mar. 14, 2020.

(51) Int. Cl.
*G06T 7/41* (2017.01)
*G06T 7/593* (2017.01)

(52) U.S. Cl.
CPC .............. *G06T 7/41* (2017.01); *G06T 7/593* (2017.01); *G06T 2207/10021* (2013.01); *G06T 2207/10028* (2013.01); *G06T 2207/20021* (2013.01)

(58) Field of Classification Search
CPC . G06T 7/41; G06T 7/593; G06T 2207/10021; G06T 2207/10028; G06T 2207/20021; G06T 2207/30132
See application file for complete search history.

(56) References Cited

U.S. PATENT DOCUMENTS

| 2018/0040137 A1* | 2/2018 | Barajas Hernandez ..................... G06T 17/05 |
| 2019/0154442 A1* | 5/2019 | Annovi ................. G01B 11/24 |
| 2022/0004762 A1* | 1/2022 | Kottenstette ........ G06F 18/2413 |

OTHER PUBLICATIONS

Westoby et al., "'Structure-from-Motion' photogrammetry: A low-cost effective tool for geoscience applications", Geomorphology 179 (2012) pp. 300-314 (Year: 2012).*

(Continued)

*Primary Examiner* — Chan S Park
*Assistant Examiner* — Daniel C Chang
(74) *Attorney, Agent, or Firm* — Piroozi-IP, LLC

(57) ABSTRACT

A method of determining macrotexture of an object is presented which includes obtaining a plurality of stereo images from an object, generating a local coordinate system for each image, detecting one or more local keypoints each having a local coordinate, generating a global coordinate system based on a plurality of ground control points (GCPs) with apriori position knowledge of each of the plurality of GCPs, transforming the one or more local keypoints in each image to one or more global keypoints each having a global coordinate, generating a sparse point cloud based on the one or more global keypoints, reconstructing a 3D dense point cloud of the object based on neighboring pixels of each of the one or more local keypoints and calculating the global coordinates of each pixel of the 3D dense point cloud, and obtaining the macrotexture based on the reconstructed 3D dense point cloud of the object.

20 Claims, 12 Drawing Sheets
(7 of 12 Drawing Sheet(s) Filed in Color)

(56) References Cited

OTHER PUBLICATIONS

Kogbara et al., "Relating surface texture parameters from close range photogrammetry to Grip-Tester pavement friction measurements", Construction and Building Materials 166 (2018) pp. 227-240 (Year: 2018).*

Micheletti et al., "Investigating the geomorphological potential of freely available and accessible structure-from-motion photogrammetry using a smartphone", Loughborough University. Journal contribution, 2019 (Year: 2019).*

Abe et al., (2001). Measurement of Pavement Macrotexture with Circular Texture Meter. Transportation Research Record. 1764. 201-209. 10.3141/1764-21.

Abulizi et al., (2016). Measuring and evaluating of road roughness conditions with a compact road profiler and ArcGIS. Journal of Traffic and Transportation Engineering (English Edition), 3(5), 398-411.

Aktaş et al., (2011). Comparative Analysis of Macrotexture Measurement Tests for Pavement Preservation Treatments Transportation Research Record: Journal of the Transportation Research Board, 2209(1), 34-40.

ASTM E1845-09, (2015). Standard Practice for Calculating Pavement Macrotexture Mean Profile Depth, ASTM International, West Conshohocken, PA.

Babu et al., (2019). Pavement Drainage Structures. Pavement Drainage, 43-116.

Bitelli et al., (2012). Laser Scanning on Road Pavements: A New Approach for Characterizing Surface Texture. Sensors, 12(7), 9110-9128.

Calonder et al., (2010). BRIEF: Binary Robust Independent Elementary Features. Computer Vision—ECCV 2010 Lecture Notes in Computer Science, 778-792.

Chandler et al., (2005). Metric Capabilities of Low Cost Digital Cameras for Close Range Surface Measurement. The Photogrammetric Record, 20(109), pp. 12-26.

Das et al., (2015). Study of road surface characteristics in frequency domain using micro-optical 3-D camera. KSCE Journal of Civil Engineering, 19(5), 1282-1291.

Dong et al., (2019). Reconstruction of 3D Pavement Texture on Handling Dropouts and Spikes Using Multiple Data Processing Methods. Sensors, 19(2), 278.

Dunford, (2013). Friction and the Texture of Aggregate Particles Used in the Road Surface Course, Ph.D. Thesis, University of Nottingham.

Edmondson et al., (2019). Improved non-contact 3D field and processing techniques to achieve macrotexture characterisation of pavements. Construction and Building Materials. 227. 116693.

Ejsmont et al., (2016). Road texture influence on tyre rolling resistance. Road Materials and Pavement Design, 18 (1), 181-198.

Fisco et al., (2014). Comparison of Surface Macrotexture Measurement Methods. Journal of Civil Engineering and Management, 19(Supplement_1), 153-160.

Gendy et al., (2011). Stereo-vision applications to reconstruct the 3D texture of pavement surface. International Journal of Pavement Engineering, 12(3), 263-273.

Georgopoulos et al., (1995). Digital Image Processing as a Tool for Pavement Distress Evaluation. ISPRS Journal of Photogrammetry and Remote Sensing, 50(1), pp. 23-33.

White et al., (2019). Field evaluation of a handheld laser meter for pavement surface macrotexture measurement, International Journal of Pavement Engineering.

Henry, (2000). Evaluation of Pavement Friction Characteristics. Transportation Research Board, (291), 0547-5570.

Leutenegger et al., (2011). BRISK: Binary Robust invariant scalable keypoints. 2011 International Conference on Computer Vision.

Li et al., (2016). Geometric texture indicators for safety on AC pavements with 1mm 3D laser texture data. International Journal of Pavement Research and Technology, 9(1), 49-62.

Lowe, (1999). Object recognition from local scale-invariant features. Proceedings of the Seventh IEEE International Conference on Computer Vision.

Lowe, (2004). Distinctive Image Features from Scale-Invariant Keypoints. International Journal of Computer Vision, 60(2), 91-110.

Micheletti et al., (2014). Investigating the geomorphological potential of freely available and accessible structure-from-motion photogrammetry using a smartphone. Earth Surface Processes and Landforms, 40(4), 473-486.

Patzak, T., Hase, M., Roos, R., & Worner, T. (2016). Friction of different surface courses. 6th Eurasphalt & Eurobitume Congress.

Praticò et al., (2015). A study on the relationship between mean texture depth and mean profile depth of asphalt pavements. Construction and Building Materials, 101, 72-79.

Rublee et al., (2011). ORB: An efficient alternative to SIFT or SURF. 2011 International Conference on Computer Vision.

Seitz et al., (2006). A Comparison and Evaluation of Multi-View Stereo Reconstruction Algorithms. 2006 IEEE Computer Society Conference on Computer Vision and Pattern Recognition—vol. 1 (CVPR06).

Sengoz et al., (2012). Comparison of pavement surface texture determination by sand patch test and 3D laser scanning. Periodica Polytechnica Civil Engineering, 56(1), 73.

Ullman, (1979). The interpretation of structure from motion. Proceedings of the Royal Society of London. 203 (1153), 405-426.

Westoby et al., (2012). 'Structure-from-Motion' photogrammetry: A low-cost, effective tool for geoscience applications. Geomorphology. 179. 300-314.

Yaacob et al., (2014). Comparison of Sand Patch Test and Multi Laser Profiler in Pavement Surface Measurement. Jurnal Teknologi, 70(4).

Kogbara et al., (2018). Relating surface texture parameters from close range photogrammetry to Grip-Tester pavement friction measurements. Construction and Building Materials, 166, 227-240.

* cited by examiner

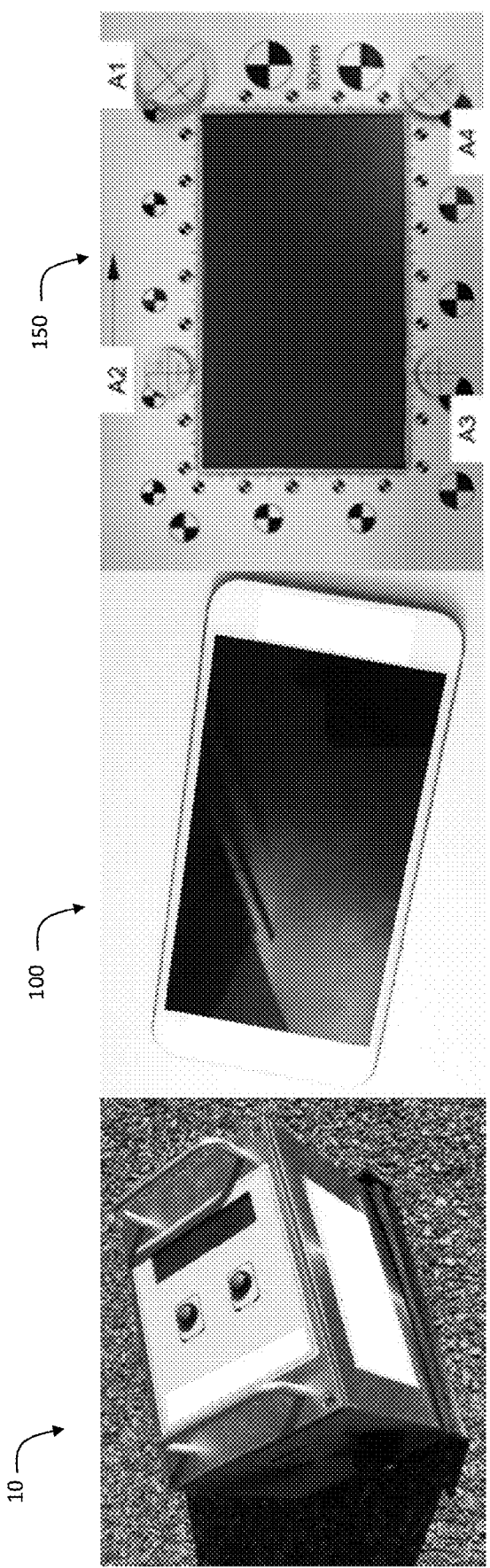

PAVEMENT MACROTEXTURE DETERMINATION USING MULTI-VIEW SMARTPHONE IMAGES

CROSS-REFERENCE TO RELATED APPLICATIONS

The present patent application is related to and claims the priority benefit of U.S. Provisional Patent Application Ser. No. 62/989,670, filed Mar. 14, 2020, the contents of which are hereby incorporated by reference in its entirety into the present disclosure.

STATEMENT REGARDING GOVERNMENT FUNDING

The technology described in the present disclosure was not made with government support.

TECHNICAL FIELD

The present disclosure generally relates to determining texture of a surface, and in particular, to a system and method of determining macrotexture of a pavement using a smartphone.

BACKGROUND

This section introduces aspects that may help facilitate a better understanding of the disclosure. Accordingly, these statements are to be read in this light and are not to be understood as admissions about what is or is not prior art.

The quality properties of road pavements have direct and significant impacts on road safety. According to Indiana Crash Facts 2017, about 200,000 vehicle crashes occurred in Indiana every year from 2013 through 2017, of which about 34,000 accidents resulted in injuries and 755 accidents caused fatalities. Twenty percent of these accidents were further attributed to insufficient surface friction on road curves.

It is essential to provide adequate friction and drainage to reduce the possibility of accidents on roads; and these two properties are mainly determined by pavement (surface) textures. Pavement texture, which can be defined as the deviation of a pavement surface from a true planar surface, as it is known in the prior art, directly affects the various parameters resulting from tire-road interactions such as friction, tire noise, skid resistance, tire wear, rolling resistance, splash and spray, traffic vibration, etc., as it is known in the prior art. It was suggested in the 1987 Permanent International Association of Road Congresses (PIARC), depending on the amplitude and wavelength of a feature, to divide the pavement surface characteristics (the geometric profile of a road in the vertical plane) in four categories: roughness (unevenness), megatexture, macrotexture, and microtexture, as it is known in the prior art.

Roughness refers to the unevenness, potholes, and large cracks on road surfaces that are larger than a tire footprint, as it is known in the prior art. Megatexture is associated with deviations in wavelengths from 50 mm to 500 mm and vertical amplitudes ranging from 0.1 mm to 50 mm, as it is known in the prior art. Texture of this size is mainly caused by poor construction practices or surface deterioration. This level of texture causes vibrations in tire walls, resulting in vehicle noise and some external noise. Macrotexture and microtexture refer to the relatively small pavement surface irregularities that primarily affect friction and skid resistance. Macrotexture refers to the changes in wavelengths ranging from 0.5 mm to 50 mm horizontally and variations ranging from 0.1 mm to 20 mm vertically, as it is known in the prior art. However, microtexture, which corresponds to wavelengths less than 0.5 mm horizontally and vertical amplitudes up to 0.2 mm, is related to the roughness of the individual stone elements used in the surface layer and to the natural mineral aggregate, as it is known in the prior art.

Although both microtexture and macrotexture contribute to pavement friction, there is currently no practical procedure for direct measurement of the microtexture profile in traffic, as it is known in the prior art. The PIARC Model for the International Friction Index (IFI) avoids the need for measuring microtexture if macrotexture measures are available. A measurement at any slip speed, together with the macrotexture parameter, determines the friction as a function of the slip speed, as it is known in the prior art. The typical parameter to describe pavement macrotexture is the mean profile depth (MPD) or the mean texture depth (MTD). MPD is linear related to MTD and is usually converted to MTD when comparing different macrotexture calculation methods, as it is known in the prior art. The conventional methods for determining road macrotexture include the sand patch method, the outflow method, and laser profiling.

The sand patch method is operator-dependent and the test results have poor repeatability, as it is known in the prior art. Other problems with the sand patch method include that on surfaces with very deep textures it is very easy to overestimate the texture depth, as it is known in the prior art, and accurate sand patch testing cannot be done when the road surface is sticky or wet, as it is known in the prior art. As is the case with the sand patch method, the outflow method also is labor-intensive and time-consuming, and the reliability of the results depends largely on the operator. The circular laser-based device has been deployed for routine macrotexture measurement since 2002, as it is known in the prior art, and the more portable handheld laser meter, such as Ames Laser texture Scanner (LTS) and ELAtext meter, as it is known in the prior art, were used and evaluated for macrotexture measurement. Laser-based linear profiling devices have been shown to be able to improve testing efficiency to a great degree, as it is known in the prior art. It has been shown that the macrotexture measurement results from an ELAtext meter were reliable compared to the sand patch method. The advantages of the laser-based device over the sand patch method is that it is more portable, repeatable, efficient and less operator-dependent, and the major defect for the laser-based device is its high cost, as it is known in the prior art. Moreover, its high cost also restricts its use over large areas for multi-division transportation agencies.

Despite these efforts, the field of studying pavement microtexture and macrotexture, while exceedingly important, remains inadequate and thus improvement therein are warranted.

SUMMARY

A method of determining macrotexture of an object is disclosed. The method includes obtaining a plurality of stereo images from an object collected from a plurality of angles by an imaging device. The method also includes generating a local coordinate system for each image of the plurality of stereo images. Additionally, the method includes detecting one or more local keypoints each having a local coordinate in each image of the plurality of stereo images. Furthermore, the method includes generating a global coordinate system based on a plurality of ground control points (GCPs) with apriori position knowledge of each of the plurality of GCPs. The method also includes transforming the one or more local keypoints in each image of the plurality of stereo images to one or more global keypoints each having a global coordinate. Additionally, the method includes generating a sparse point cloud based on the one or more global keypoints, reconstructing a 3D dense point cloud of the object based on neighboring pixels of each of the one or more local keypoints and calculating the global coordinates of each pixel of the 3D dense point cloud, and obtaining the macrotexture based on the reconstructed 3D dense point cloud of the object.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1a is a photograph of a laser texture scanner (LTS) used to establish the efficacy of the present disclosure FIG. 1b is a photograph of an imaging device (e.g., a smartphone) that can be used with the method of the present disclosure.

FIG. 1c is a photograph of a control frame including a plurality of 4 ground control points (A1, A2, A3, and A4) used to establish a global coordinate system.

DETAILED DESCRIPTION

Figure 2B:
FIGS. 2a, 2b, 2c, and 2d are photographs of roadways used to study the method of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Despite the art alluded to above, neither reconstructed point cloud nor using multiple images collected by smartphone cameras, have been carried out which are much more convenient, flexible, and affordable. The present disclosure describes capability of using tens of smartphone images combined with advanced computer vision techniques to fill the gap left with the prior art approaches.

Towards this end, the present disclosure describes a low-cost, ubiquitous smartphone image-based sensing technique for pavement macrotexture measurement. The novel approach presented here uses smartphone images collected onsite to generate accurate and detailed 3D pavement point clouds by the structure from motion and multi-view stereo technique. Then, analytics is developed to determine and analyze the road pavement macrotexture. To evaluate the image-based solution of the present disclosure, a laser scanner (e.g., Ames LTS) is used to provide reference measurement. Based on the comparison between the results from the proposed method and the Ames LTS, the present disclosure demonstrates the capability of the smartphone camera on pavement surface macrotexture measurement.

The proposed solution is based on multi-view smartphone images collected in situ over the pavement. Computer vision techniques are then applied to create high resolution three-dimensional (3D) point clouds of the pavement. The present disclosure provides the analytics to determine the primary macrotexture metric: Mean Profile Depth (MPD). Experiments with 790 images over 25 spots of three State Roads and 6 spots of an Indiana Department of Transportation (INDOT) test site demonstrated that the multi-view smartphone images can yield results comparable to conventional laser texture scanner.

Both a laser texture scanner and a smartphone were used for data collection. FIGS. 1a, 1b, and 1c are three images of i) a laser texture scanner 10 (LTS MODEL 9400), shown in FIG. 1a), ii) a smartphone 100, shown in FIG. 1b, and iii) a control frame 150, shown in FIG. 1c, present a system which can calculate the pavement's MPD, texture profile index (TPI), estimated texture depth (ETD), and root mean square (RMS) of peaks and valleys. The characteristics of LTS are listed in Table 1. The LTS immediately displays the measurement results on the LCD display. As for measuring MPD, the LTS can scan ten 100-mm-length-profiles along the road direction, and these ten profiles are unevenly spaced across the road direction. The average point spacing within each profile was 0.014286 mm. The MPD for each profile was calculated and the arithmetic mean of the ten MPDs was considered as the MPD over the area measured. In this study, the LTS is mainly used for measuring the MPD for a pavement surface, and is used as a gold reference method compared to the proposed image-based method.

TABLE 1

| Characteristics of LTS MODEL 9400 | | | |
|---|---|---|---|
| Characteristics | Values | Characteristics | Values |
| Scan area/mm | 107.95 × 72.01 | Triangulation Angle at the center of range | 32° |
| Vertical Resolution/mm | 0.015 | Dot size at center of range/um | 50 |
| Maximum Length Resolution/mm | 0.015 | Dot size at max and min range/um | 220 |
| Maximum Width Resolution/mm | 0.0635 | Max laser sampling speed/kHz | 1 |

The pavement images were collected with a commonly used smartphone 100, see FIG. 1b, which has, according to a non-limiting example, two 12 MP rear cameras: 1) a wide-angle camera with a f/1.8 aperture and 2) a telephoto camera with a f/2.8 aperture. The second camera is designed to generate a depth-of-field effect, and thus composes a photograph that maintains the subject sharp with a blurred background. According to one embodiment of the present disclosure, only the first camera is deployed. The dimension of each image is 4032 pixels×3024 pixels. The detailed characteristics of exemplary smartphone is shown in Table 2. After the images were collected, a 3D point cloud of the pavement surface was reconstructed using AGISOFT METASHAPE.

TABLE 2

Exemplary characteristics of a smartphone

| Characteristics | Values |
| --- | --- |
| Wide-angle camera aperture | f/1.8 |
| Telephoto camera aperture | f/2.8 |
| Image dimension | 4032 pix × 3024 pix |
| pixel size | 1.22 μm × 1.22 μm |

To provide control and reference for measurement, a control frame was placed in the scene when the images were collected. The control frame was used as a reference mark for 3D reconstruction when collecting the pavement surface images analyzing MPD on an exemplary road surface test site, as shown in FIG. 1c. The dimension of the central rectangular area is 152 mm long and 90 mm wide, and is made of plastically laminated hard paper. There are many marking points on the surface of the template, which are used as references. Moreover, four ground control points (GCPs) denoted as A1, A2, A3, and A4 with different heights are glued on the template, which are used as the height ruler. The relative heights of these four targets are 8.15 mm, 3.20 mm, 2.90 mm, and 3.36 mm, respectively, measured by a vernier caliper which provides a precision to 0.01 mm, and the distances between each object are measured by the same vernier caliper. Table 3 shows the average of three repeated measurements for each of the targets using the vernier caliper and placed on a control frame (i.e., a frame housing the GCPs). The dimensions of the rectangular area enclosed by these four targets is the same as the scan area of the LTS, which is 100 mm long and 90 mm wide, to assure that the observation area is consistent for both the LTS and the smartphone.

TABLE 3

Summary on the measurements of the GCPs on the control frame

| Height (mm) | | | | Distance (mm) | | | | | |
| --- | --- | --- | --- | --- | --- | --- | --- | --- | --- |
| A1 | A2 | A3 | A4 | A1-A2 | A2-A3 | A3-A4 | A4-A1 | A1-A3 | A2-A4 |
| 8.15 | 3.20 | 2.90 | 3.36 | 120.76 | 114.86 | 119.42 | 111.37 | 166.01 | 163.98 |

Since LTS is a gold-standard used to measure MPD, the MPD measured by LTS is assumed to be accurate and reliable. Therefore, the MPD by LTS is used to validate the accuracy of the method of the present disclosure. The data collection procedure for MPD analysis of the proposed method includes the following steps: (1) Choose a randomly chosen area and mark the area at the pavement surface; (2) Apply the control frame to the randomly chosen area along the road direction and apply the LTS on top of control frame, making sure that the laser scans are along the road direction, while scanning the randomly chosen area and calculating the MPD; (3) remove the LTS leaving the control frame on road, obtain between 20-32 images for the randomly chosen area using a smartphone following a circular pattern, which is about 400 mm high to the area center and the diameter is about 600 mm; and (4) Move to the next randomly chosen area and repeat steps (1) to (3) until all randomly chosen areas according to a preplanned number of randomly chosen areas are completed.

Figure 2D:
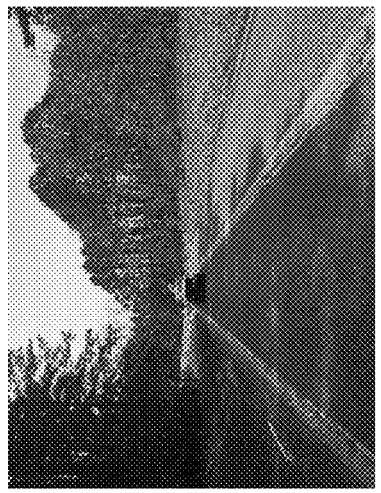
Figure 2A:
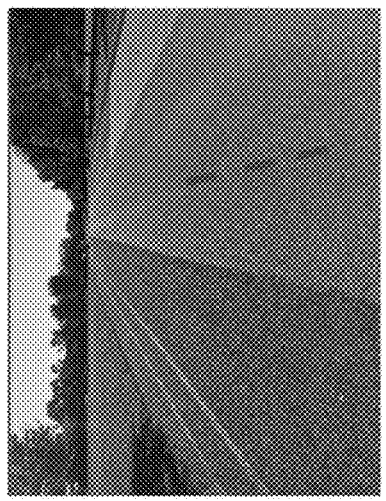

There are three different types of pavements tested. Referring to FIG. 2a, the right lane is 3-year-old hot-mix asphalt (HMA) pavement; and the left lane is 10-year-old HMA pavement. A 1 m×1 m high friction surface treatment (HFST) area is constructed on top of the 10-year-old HMA pavement. HFST is a process by which a high friction surface is applied to the asphalt. For each pavement, there are two testing area collecting data. Table 4 summarizes the testing areas at the INDOT test site.

TABLE 4

Summary of data collected at the test site spots

| | LTS | Image method | |
| --- | --- | --- | --- |
| Type of pavement | Number of areas | Number of areas | Number of images for each area |
| 10-year-old HMA | 2 | 2 | 27 |
| 3-year-old HMA | 2 | 2 | 22, 29 |
| HFST | 2 | 2 | 24, 25 |

HFST was performed in three similarly situated roadways. With respect to roadway #1, before the HFST, the existing pavement surface was a 9.5 mm HMA mixture. On the day of treatment, the LTS was applied and 11 MPDs were collected for construction quality control. About eight months after treatment, 3 MPDs by LTS and 64 images were collected at 3 spots. The detailed information of data collected is shown in Table 5, and FIG. 2b shows a glance of the associated roadway. The LTS and smartphone testing was conducted side by side simultaneously instead of using the exact same locations consecutively.

Figure 2C:
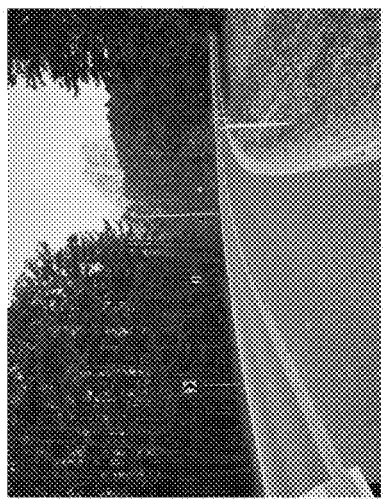

With respect to roadway #2, before the HFST, the existing pavement surface was single-layer chip seal. On the day of treatment, the LTS was applied and 10 MPDs were collected for construction quality control. About six months after treatment, 7 MPDs by LTS were measured at 7 spots and 290 images were collected at 10 spots. LTS measurement and images collection were conducted at seven of the spots, and the other three spots were used to collected images alone. The detailed information of data collected on roadway #2 is shown in Table 5, and FIG. 2c shows a glance of the roadway #2. Traffic control was necessary during the measurement process; and due to a time constraint, the LTS and smartphone testing was conducted side by side simultaneously instead of using the exact same location consecutively.

With respect to HFST on roadway #3, before the HFST, the existing pavement surface was single-layer chip seals. On the day of construction, the LTS was applied and 11 groups of MPDs were collected for construction quality control. Six months after treatment, 12 MPDs by LTS and 306 images were collected at 12 spots. The detailed information of data collected on roadway #3 is shown in Table 5, and FIG. 2d shows a glance of roadway #3.

TABLE 5

Summary of data collected at the test spots on the associated road

| | Day of Construction | After Construction | | |
|---|---|---|---|---|
| | LTS | LTS | Image method | |
| State Roads | Number of spots | Number of spots | Number of spots | Number of images for each spot |
| Roadway #1 | 11 | 3 | 3 | 20-22 |
| Roadway #2 | 10 | 7 | 10 | 20-32 |
| Roadway #3 | 11 | 12 | 12 | 22-29 |

The SfM method, first proposed in 1979 by S. Ullman, was originally based on the bundle adjustment technique (Ullman 1979). SfM uses images collected from different viewpoints but differs from traditional photogrammetry in that it automatically estimates the interior and exterior orientation parameters without using any GCPs established on the ground and seen in photos (Micheletti et al. 2014, Westoby et al. 2012). This method became possible by the emergence of algorithms such as SIFT (Lowe 1999), which were developed in the machine vision area, and are able to compute interior and exterior orientation parameters without any control point by matching the correspondence points in the images obtained from different viewpoints. However, SfM requires a much larger overlap in sequentially-captured images, just as in the case where one uses a moving sensor to create the 3D geometry of a structure, thus justifying method's SfM name (Micheletti et al. 2014).

Keypoint Generation

The SfM method aims to identify the common features in consecutive images collected from different angles to estimate the interior and exterior orientation parameters for each camera position. Therefore, the first step in SfM implementation is to detect, describe, and match the corresponding keypoints between different image-frames. For this purpose, the Scale-Invariant Feature Transform (SIFT) algorithm, which is invariant to image scaling, translation, and rotation and partially invariant to illumination changes and affine or 3D projection, is proposed (Lowe 1999; Lowe 2004). SIFT was the most appealing descriptor when it was proposed and has had a remarkable performance when it was compared to other descriptors. It is still widely used; however, high dimensionality of the descriptor, which prevents faster results, especially for on-line applications, is its drawback at the matching step. Therefore, newer versions have been proposed that aim to reduce the complexity of the SIFT method while increasing the speed. The Speeded up Robust Features (SURF) algorithm is based on properties similar to SIFT and relies on local gradient histograms; however, it uses integral images to reduce the complexity and to speed up the process (Calonder et al. 2010). Upright-SURF (U-SURF), which is a scale invariant only version of SURF, assumes camera position horizontal, making the SURF algorithm not invariant to image rotation to make the algorithm even faster. Other algorithms proposed to further increase the speed of SURF and SIFT algorithms include the Binary Robust Independent Elementary Features (BRIEF) proposed by Calonder et al. in 2010; Oriented FAST and Rotated BRIEF (ORB), which was based on BRIEF (Rublee et al. 2011); Binary Robust Invariant Scalable Keypoints (BRISK) proposed by Leutenegger et al. in 2011; and Brief and Efficient SIFT Image Matching Algorithm (BE-SIFT) proposed by Zhao et al. in 2015. The SIFT algorithm deals with the invariance to translation, rotation, and scale, which are four of the six parameters of an affine transform.

Figure 3A:
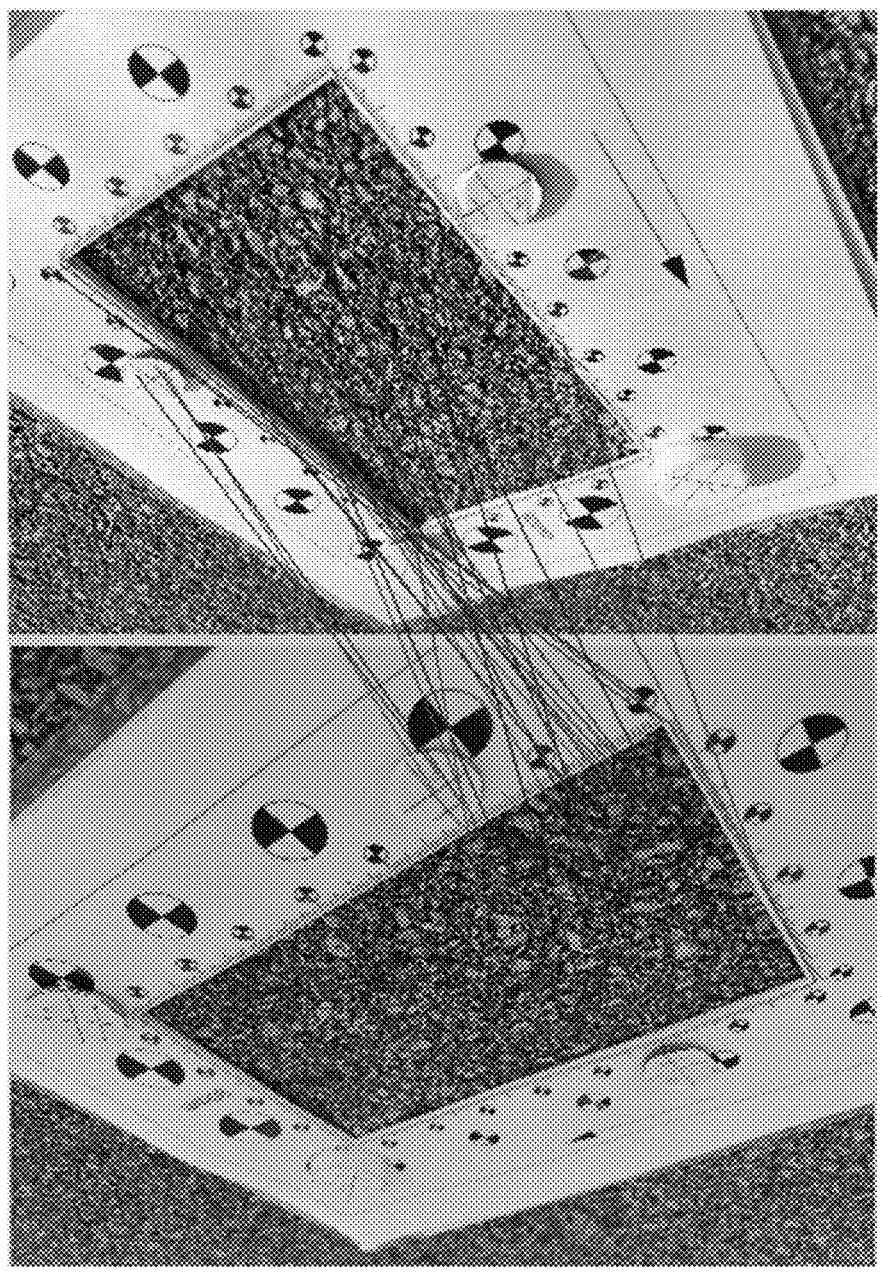
FIG. 3a is a photograph of the control frame positioned on a portion of a pavement including two images with keypoints in each image corresponding to another image.

As described, all the above algorithms include two parts: 1) keypoint detection and 2) keypoint description. For example, the SIFT algorithm includes the SIFT detector and SIFT descriptor. The detector is used to detect the keypoints on the images. Keypoint detection is based on identifying areas within an image where there is a change in pixel characteristics according to a predetermined threshold. For example, where there are discontinuities in the image whereby the pixel values change shall constitute a keypoint. During keypoint detection many areas within the image may be detected (i.e., identified) as being keypoints. The descriptor is conducted for describing the keypoints and matching these keypoints by calculating the distance between two points on different images. This unique descriptor assures that the keypoints are invariant even after rotation, shift, and scaling. After applying the keypoint detection to all the images, the next step is matching the correspondence between all keypoints on each image. FIG. 3a illustrates the keypoint matching for two images.

Bundle Adjustment

Figure 3B:
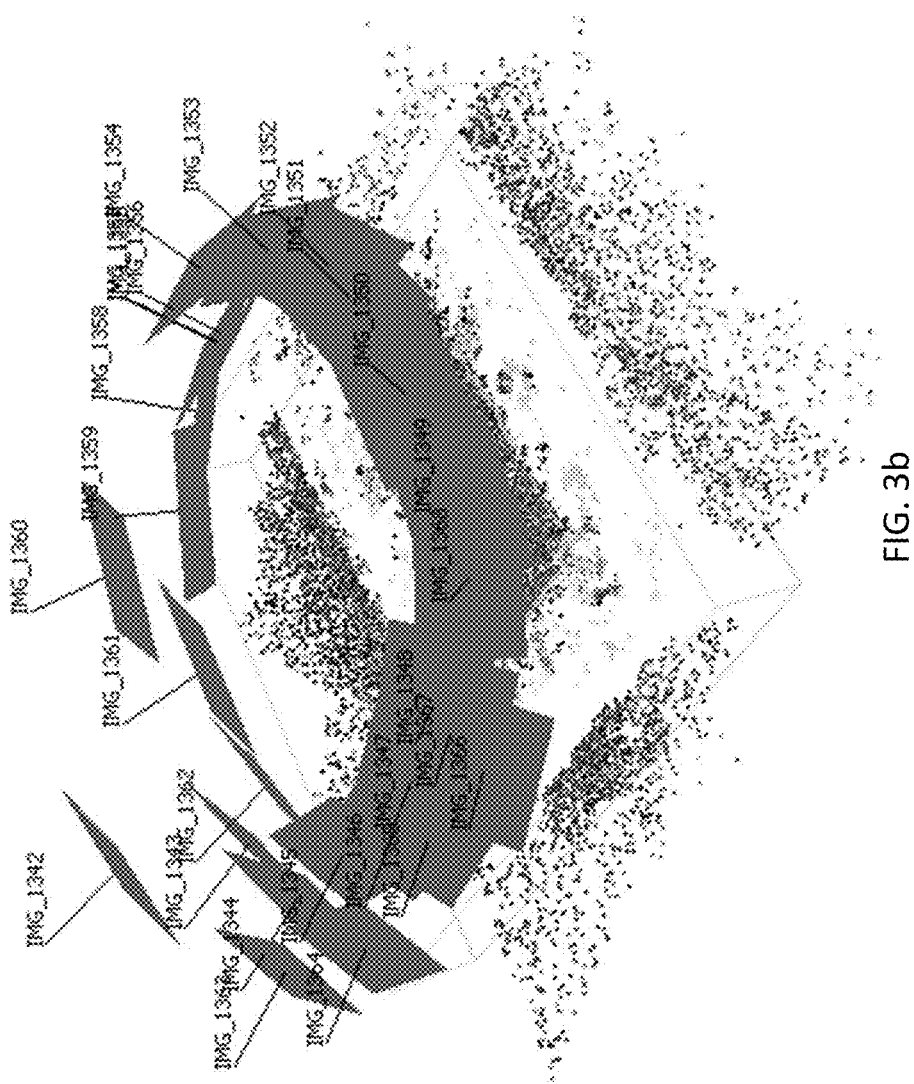
FIG. 3b is a schematic of camera positions with respect to an object according to a circular pattern showing a sparse point cloud of keypoints.

In the second step, the interior and exterior orientation parameters for each camera are estimated using the feature correspondences and bundle-adjustment algorithm to estimate the 3D geometry of the scene. At this stage, the SfM method differs from conventional photogrammetry in that SfM does not require GCPs in the scene and separate camera calibration and takes advantage of the redundancy provided by the large number of images and keypoints to estimate the exterior orientation, interior orientation, and distortion parameters. The output of this process is an unscaled sparse point cloud having an arbitrary coordinate system as well as the relative position and orientation of each camera to the object, which is shown in FIG. 3b which shows output of bundle adjustment. The dark points are sparse point cloud generated for the scene, and the blue rectangles represent the position and orientation of the images. The position of camera is based on image overlap based on a predetermined threshold. According to one embodiment, the predetermined threshold is between about 70% to about 100%.

Dense Point Cloud Generation

Figure 3C:
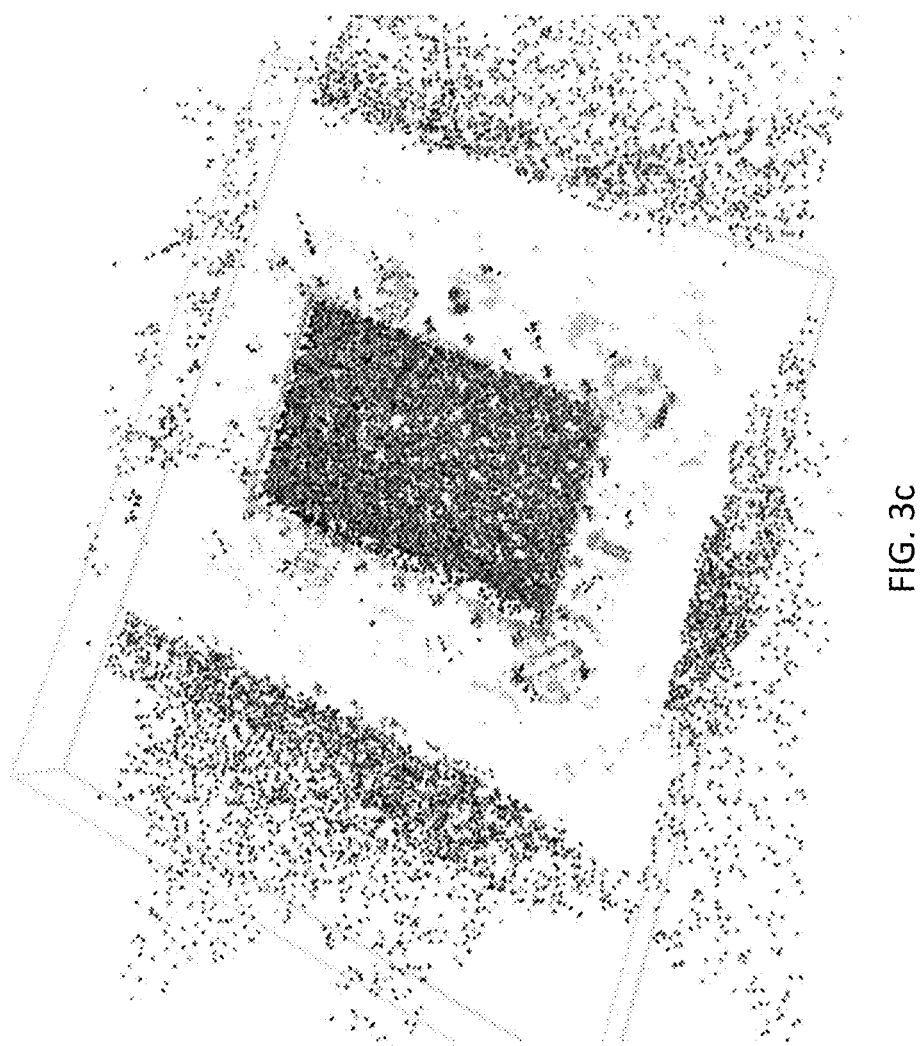
FIGS. 3c and 3d are images which illustrate the dense point cloud generated from the sparse point cloud.
Figure 3D:
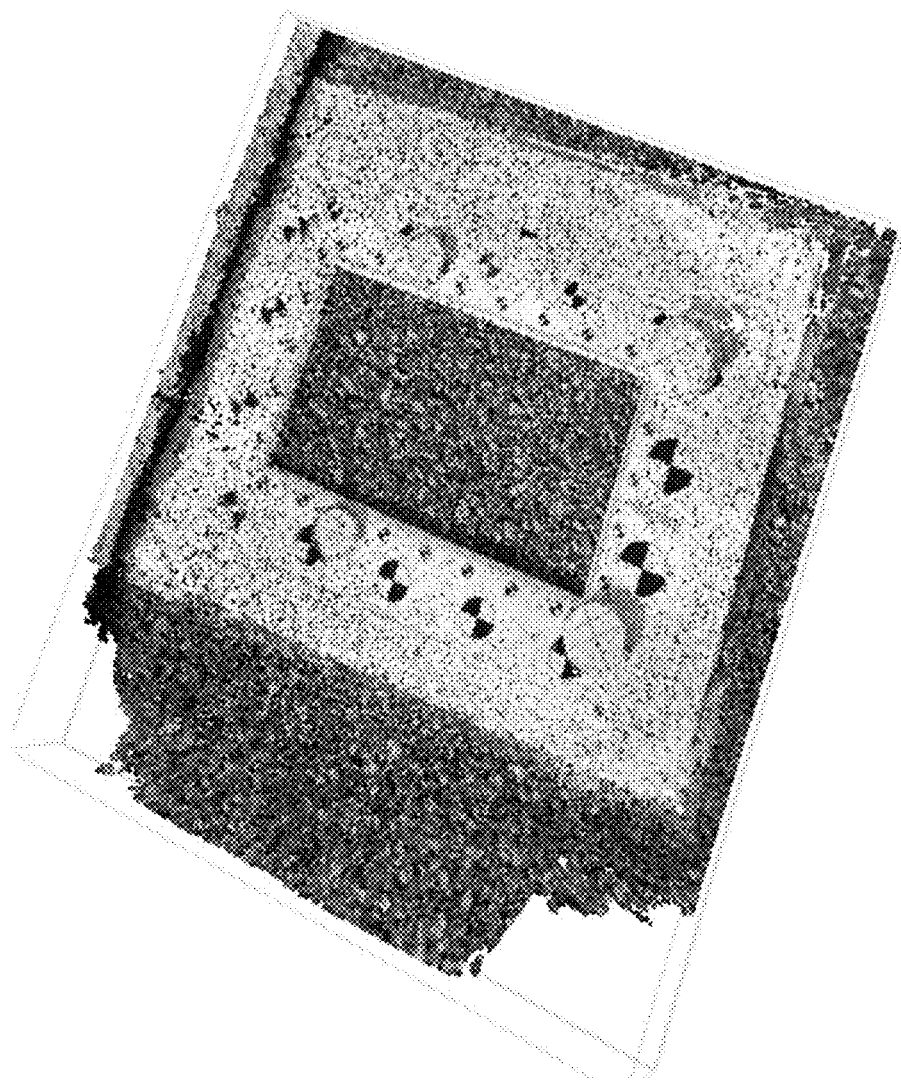

In the last step, the point density is increased by implementing MVS photogrammetry algorithms. FIGS. 3c and 3d illustrate the dense point cloud generated from the sparse point cloud. The purpose of the algorithms is to reconstruct the 3D point cloud of an object using overlapped images collected from different viewpoints and known camera positions (Seitz et al. 2006). There are 29,132 points in the sparse point cloud, and 38,510,294 points after dense matching. In fact, the SfM method ends in the second step outlined above where the sparse point cloud is generated. If a dense point cloud is also required in the application, and this is obtained with an MVS algorithm, then the name of this method becomes SfM-MVS.

The generated point cloud has an arbitrary coordinate system and can be georeferenced by providing at least three additional GCPs. As specified above, these GCPs do not need to be marked in the field. The features that are clearly visible on the image with known 3D coordinates can also be used as GCPs.

Figure 3E:
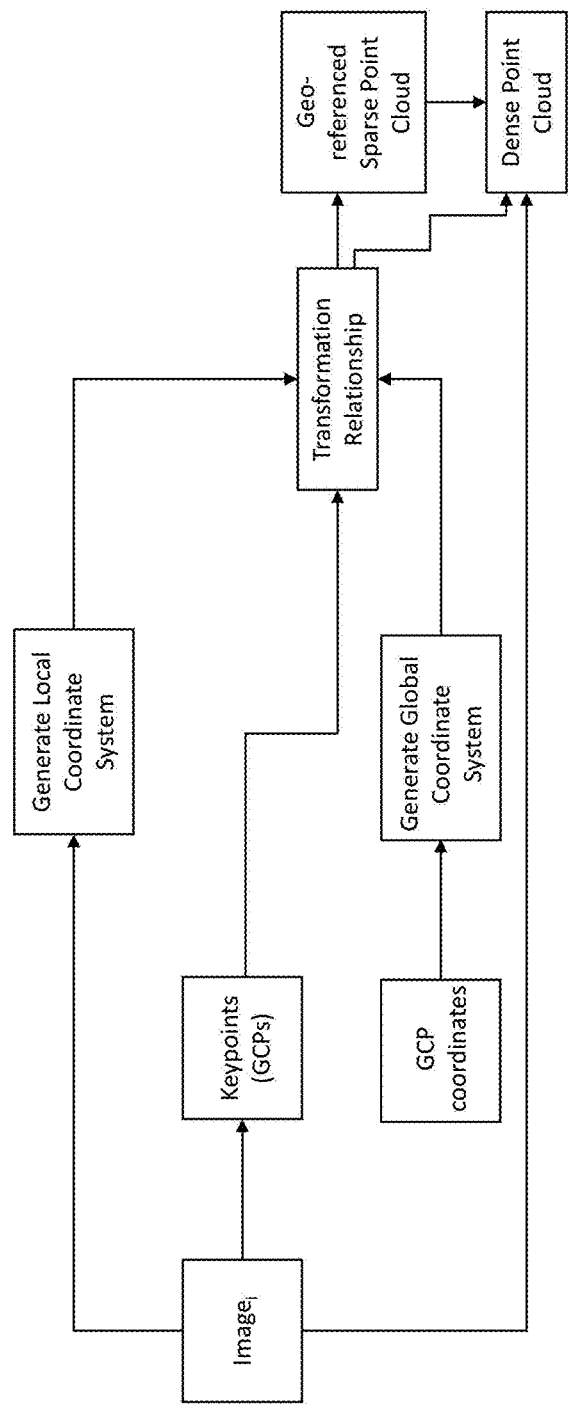
FIG. 3e is a block diagram showing steps of the method of the present disclosure.

Referring to FIG. 3e, a high-level block diagram of the operations of the method according to the present disclosure is provided. As discussed above, and with reference to FIG. 3e, an image (Image$_i$) is analyzed in order to establish the keypoints as discussed further above. A local coordinate system is generated based on each image (Image$_i$), for example, the left bottom corner of each image can be set to the origin with x, y, and z emanating from the origin. Once the local coordinate system is generated, local keypoints are detected in each image which could include the GCPs. Since a local coordinate system is generated, each local keypoint's local coordinates are also established based on the local coordinate system. In addition, based on the known positions of the GCPs, a global coordinate system is also generated. A transformation relationship is then established based on each of the local coordinate system (one per image) and the single global coordinate system. With this transformation at hand, the local coordinates of each of the local keypoints is transformed into global coordinates for global keypoints. Next, a sparse point cloud is generated based on the global coordinates of the global keypoints. As the last step, a 3D sparse cloud point is reconstructed based on neighboring pixels of the local keypoints and calculating the global coordinates of each pixel of the 3D dense point cloud. It should be noted that the images are stereo images with any two consecutive images having between about 70% and about 100% overlap.

Determining Mean Profile Depth

Figure 4:
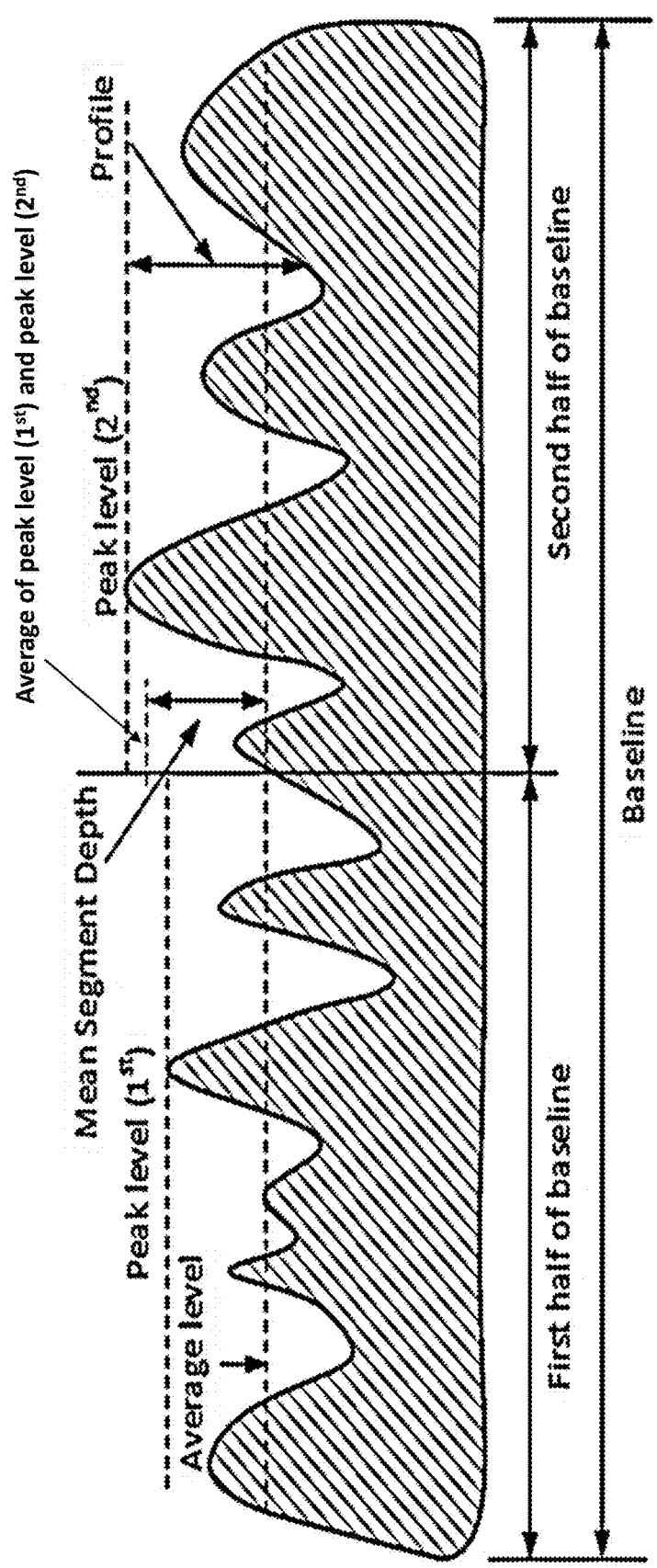
FIG. 4 is a schematic of peaks and valleys of surface of an object in a segment which is subdivided into two subdivided segments.

According to ASTM E1845-09 (ASTM 2009), MPD is the average of all the MSDs for all the segments of a profile. Each profile shall be divided into segments of 100±2 mm for analysis in the subsequent steps and each segment shall be further divided into two equal lengths of 50 mm and the maximum value is determined for each subsegments. Then these two values are averaged arithmetically to obtain the MSD. The MSD is the average value of peak level (1st) and peak level (2nd) having a given baseline (segment), as shown in FIG. 4 (ASTM 2009) which provides a procedure for determining MSD. Suppose the profile of a pavement texture is denoted by:

$$z = h(x), x \in [x_a, x_b] \quad (1)$$

The average level for the profile is denoted as Equation 2 and its coefficients are determined via Equation 3:

$$a_1 x + b_1 z + c_1 = 0, x \in [x_a, x_b] \quad (2)$$

$$\operatorname*{argmin}_{a_1, b_1, c_1} \sum_{i=1}^{n} \left( h(x_i) + \frac{a_1 x_i + c_1}{b_1} \right)^2 \quad (3)$$

Equation 4 (ASTM 2009) is the calculation equation of MSD. It is noted that the baseline is 100±2 mm long.

According to Equation 2, the calculation of MSD can be further determined via Equation 5. Suppose the number of profiles is m, then MPD is calculated by averaging the MSDs of all profile, see Equation 6

$$MSD = \frac{\text{Peak level}(1^{st}) + \text{Peak level}(2^{nd})}{2} \quad (4)$$

$$MSD = \frac{1}{2} \times \left( \frac{|a_1 x_j + b_1 h(x_j) + c_1|}{\sqrt{a_1^2 + b_1^2}} \frac{|a_1 x_k + b_1 h(x_k) + c_1|}{\sqrt{a_1^2 + b_1^2}} \right) \quad (5)$$

$$x_j \in \left[ x_a, \frac{(x_b - x_a)}{2} \right], x_k \in \left[ \frac{(x_b - x_a)}{2}, x_b \right]$$

$$MPD = \frac{1}{m} \sum_{i=1}^{n} MSD_i \quad (6)$$

After the dense point cloud of the study area is generated, MPD can be calculated from the method described above.

Ten 100-mm-profiles are measured by LTS for each spot, and the spacings between adjacent profiles are calculated. This is achieved by reading the LTS output file to get the spacings between adjacent profiles, see Table 6. To be consistent with the calculation of LTS, the authors take ten 100-mm-profiles along the road direction for each spot and maintain the same spacings between adjacent profiles as LTS. For each profile, the MPD calculation includes following steps (ASTM 2009): (1) Filter the profile and preserve the texture wavelengths ranging from 0.5 mm to 50 mm horizontally only; (2) Derive the average level by least squares as discussed above; (3) Since the profile is 100 mm, there is only one segment. Divide the segment into two equal subsegments and calculate the MSD by averaging the maximum height deviations of the subsegments as Equation 5; and (4) The only MSD is the MPD for this profile.

For each spot there are 10 MPDs for 10 profiles, and the MPD for this spot is determined by the average of these 10 MPDs.

TABLE 6

| | Spacing between adjacent profiles obtained from LTS | | | | | | | | |
|---|---|---|---|---|---|---|---|---|---|
| Adjacent profiles | 1-2 | 2-3 | 3-4 | 4-5 | 5-6 | 6-7 | 7-8 | 8-9 | 9-10 |
| Spacing (mm) | 7.9174 | 8.3255 | 8.621 | 8.7999 | 8.8599 | 8.8001 | 8.6213 | 8.326 | 7.9181 |

Figure 5:
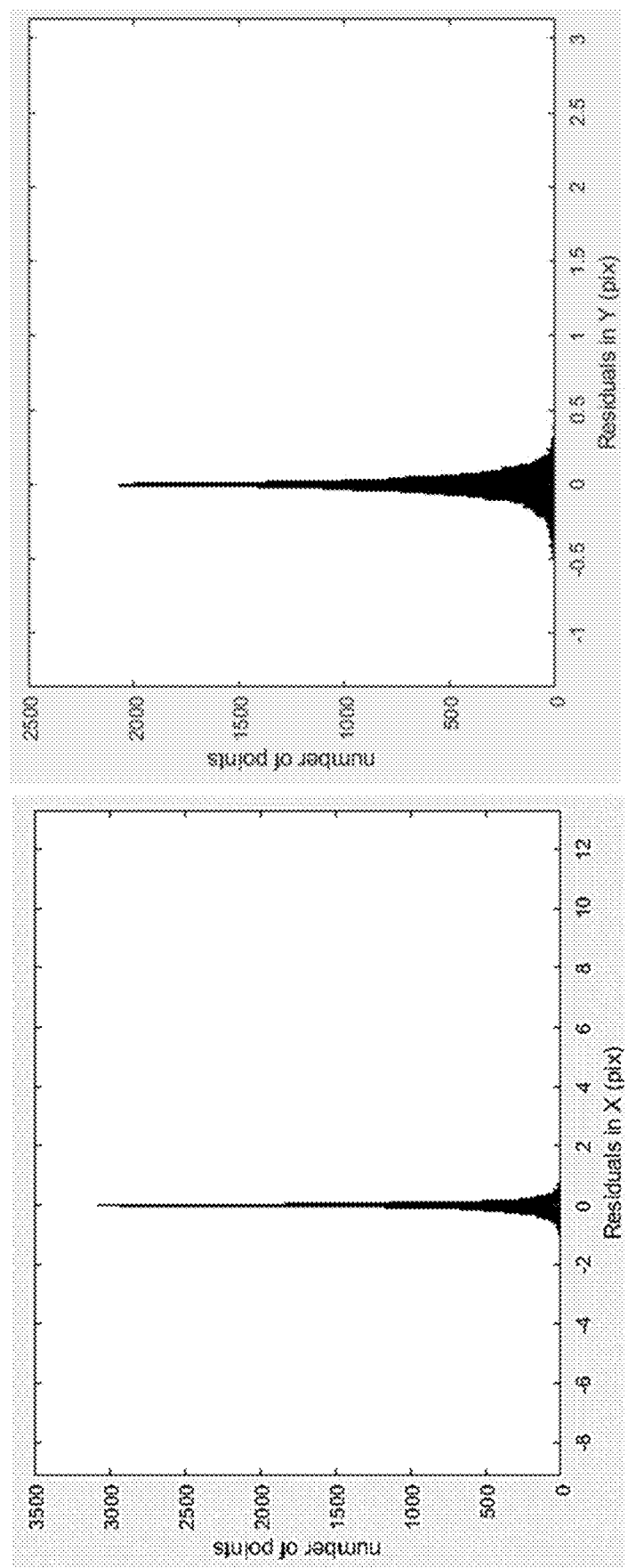
FIG. 5 provides two histograms of the distribution of the residuals of the keypoints in X and Y directions. The residuals are the difference between true local coordinates of keypoints, and the local coordinates of keypoints projected back from their global coordinates using a generated transformation relationship.

The characteristics of the generated point clouds are lists in the Table 7. For the MPD calculation, approximately 20 to 32 images were collected at each study spot and 790 images were collected in total. The control frame was deployed and four ground control points were chosen for georeferencing. The average error of these four GCPs was 1.595 mm along the X direction, 1.077 mm along the Y direction, and 0.133 mm along the Z direction. After georeferencing with GCPs and densification, thirty-one (31) 3D point clouds with a 517 average coverage area were obtained. The average number of points for each dense point cloud is 10,246,788 and 17,064 for tie points, and the average ground spacing is 0.071 mm. Once the ground coordinates of the tie points of the 3D point cloud are computed, these tie points are re-projected to the pixels on each image using the prior acquired camera position. Thus, the discrepancy between the re-projected pixel and the original pixel is the residual. Considering the central part of the dense point cloud, which is the pavement instead of the control frame, is the study area that matters, the coverage area of the study area is 135 and has 5,337,058 points and 10,025 tie points in average. The average RMS residual of the tie points within the study area is 0.102 mm on the ground and 1.436 pixel on the image, and the average maximum residual of the tie points within the study area is 0.772 mm on the ground and 10.880 pixels on the image. As an example, FIG. 5 shows the distribution of the residuals on the tie points in one of studied spots (example of residual distribution of tie points in X and Y directions). The residuals in X and Y directions are in normal distribution with a mean of −0.0273 pixels in X and −0.0117 pixels in Y. More than 95% of the residuals are within mean±2σ. To sum up, the dense point clouds generated for MPD calculation are in high quality and fine resolution.

Table 8. The MPDs of spot 1 and spot 2 represent the macrotexture of 3-year-old HMA pavement whose average MPD is 0.624 mm. The MPDs of spot 3 and spot 4 represent the macrotexture of 10-year-old HMA pavement whose average MPD is 1.299 mm, which was larger than the 3-year-old HMA pavement's MPD. After 10 years the asphalt had been stripped and the gravel layer was exposed which accounted for its larger MPD than the 3-year old HMA pavement. Finally, the MPDs of spot 5 and spot 6 represent the macrotexture of the HFST pavement, which is larger than that the MPD of both HMA pavements. Accordingly, as the time goes on, the MPD of pavement would decrease first then increase, and the MPD of HFST is improved by 200% compared to the 3-year-old pavement and by 50% with respect to the 10-year-old pavement. Therefore, applying HFST on the existing old road is an effective to increase the pavement friction.

TABLE 7

Overall characteristics of the image-based point clouds

| #. images | #. 3D point clouds | Avg. #. points | Avg. #. tie points | Avg. ground spacing (mm) | #. GCPs | Residual of GCPs | | | Avg. RMS residual for tie points (pix) |
|---|---|---|---|---|---|---|---|---|---|
| | | | | | | X (mm) | Y (mm) | Z (mm) | |
| 790 | 31 | 5,337,058 | 10,025 | 0.071 | 4 | 1.595 | 1.077 | 0.133 | 1.436 |

Figure 6A:
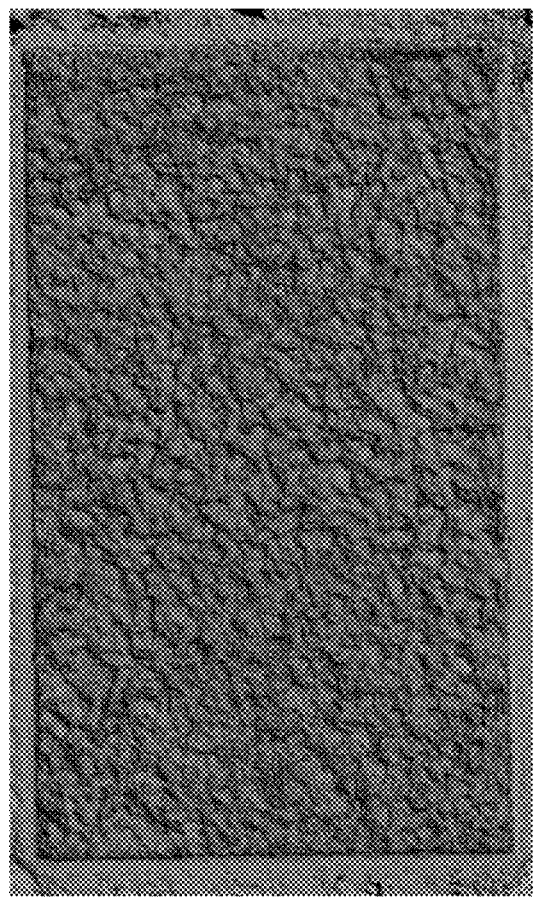
FIGS. 6a, 6b, 6c, and 6d are images that represent examples of 3D point dense clouds generated from 4 different roadways.
Figure 6B:
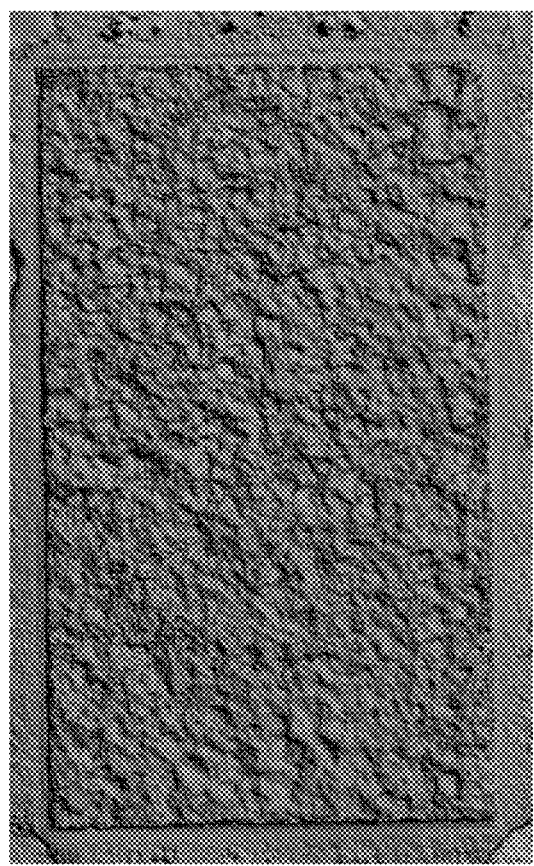
Figures 6C, 6D:
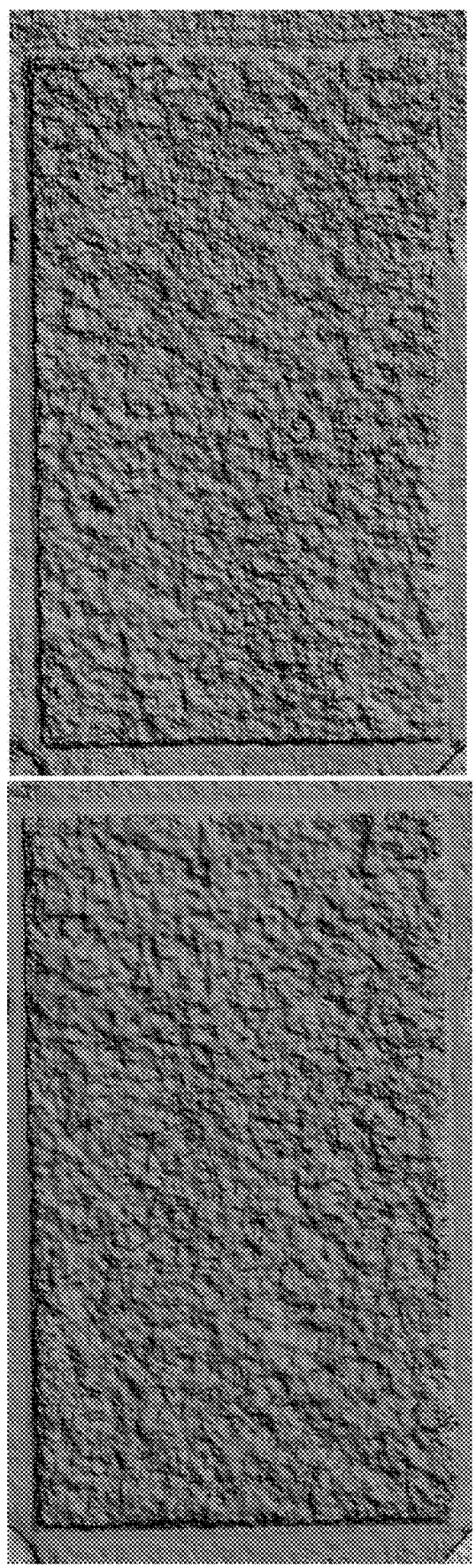

FIGS. 6a-6d presents examples of 3D point clouds generated (test site (FIG. 6a), roadway #1 (FIG. 6b), roadway #2 (FIG. 6c), and roadway #3 (FIG. 6d). It can be seen that the center of the model within the control frame retains high quality while the surrounding margin of the model is the area where distortion occurred. The distortion has rare impact on the MPD calculation.

On the one hand, it mainly originates from the lens distortion of the original images which can be largely reduced through lens calibration easily. On the other hand, the study area is located at the center of the images and 3D point cloud and very little lens distortion exists. Another noticeable characteristic is the blank area without any points that exists on the pure white area of the control frame and does not have significant impact on MPD calculation too. This blank area occurred because few obvious feature points can be detected at the first step of SfM, and the sparse point cloud produces an entire blank area in the dense point cloud.

The first data collection location was the test site, where 6 MPDs by LTS and 130 images were collected from 6 different spots at the test site. The MPD results are listed in

TABLE 8

MPD from LTS and images for the test site

| Type of pavement | | 3-year-old HMA pavement | | | 10-year-old HMA pavement | | | HFST pavement | | |
|---|---|---|---|---|---|---|---|---|---|---|
| Spot ID | | 1 | 2 | Avg. | 3 | 4 | Avg. | 5 | 6 | Avg. |
| Image method | # of images | 27 | 27 | | 22 | 29 | | 25 | 24 | |
| | MPD (mm) | 0.559 | 0.639 | 0.599 | 1.244 | 1.388 | 1.316 | 2.030 | 1.864 | 1.947 |
| LTS method | MPD (mm) | 0.515 | 0.733 | 0.624 | 1.275 | 1.323 | 1.299 | 1.749 | 2.073 | 1.911 |
| Difference of MPD (%) | | 8.6 | −12.9 | −2.15 | −2.4 | 4.9 | 1.25 | 16.0 | −10.1 | 2.95 |

As shown in Table 8, the MPDs measured by LTS range from 0.515 mm to 2.073 mm, and the MPDs based on images range from 0.559 mm to 2.030 mm. The average MPDs for 3-year-old HMA pavement, 10-year-old HMA pavement, and HFST pavement at the 6 INDOT spots measured by LTS are 0.624 mm, 1.299 mm, and 1.911 mm and the average MPDs by proposed image-based method are 0.599 mm, 1.316 mm and 1.947 mm, respectively. The difference between the average MPDs for the two methods was less than 6%. It can be seen that the image-based method of the present disclosure has the capability of acquiring comparable MPD results as the LTS.

Figure 7:
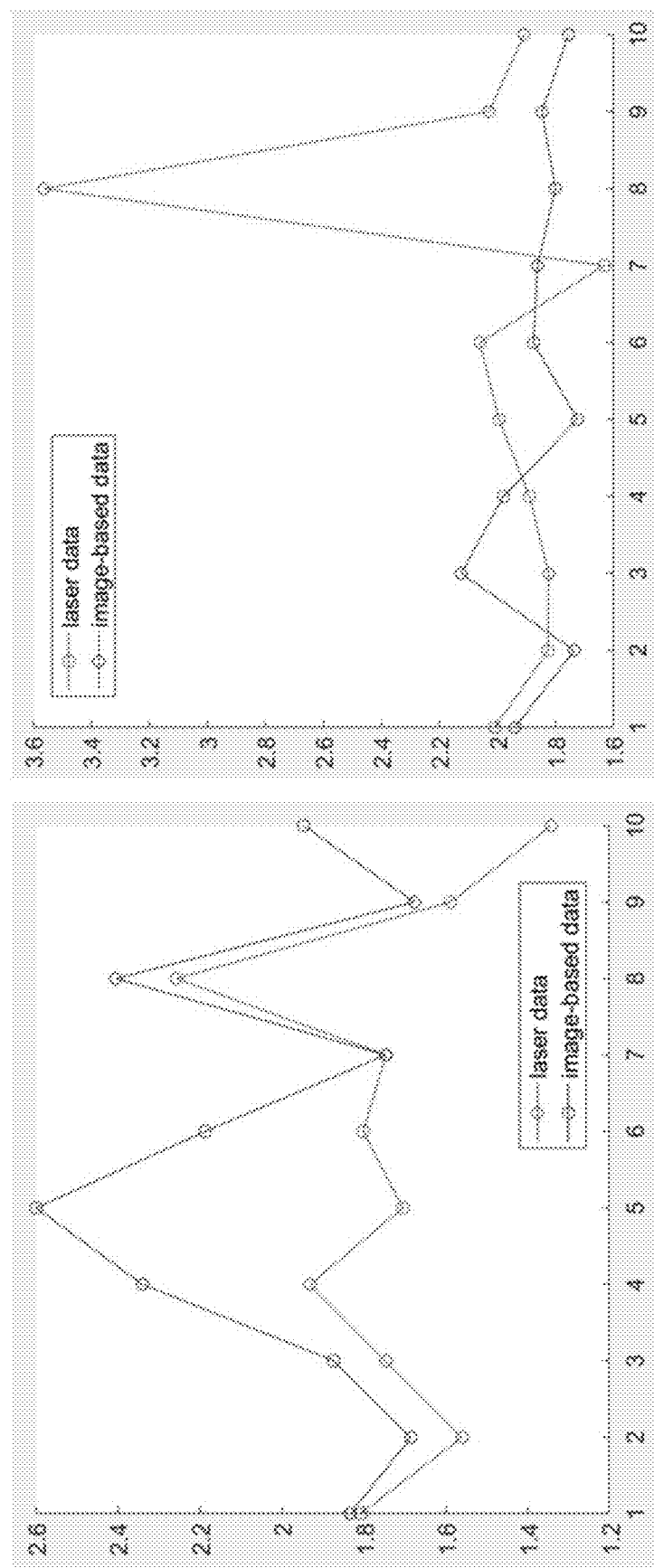
FIG. 7 provides two graphs which show two examples of the comparison between Mean Profile Depths of 10 profiles between a gold standard LTS system and image-based method of the present disclosure for two test spots.

There is a large discrepancy between the MPD results from the LTS and image-based method. FIG. 7 shows two examples of the comparison between MPDs of 10 profiles between LTS and image-based method for spot 5 and spot 6 at the test site. After the detailed investigation on the comparison of the 10 profiles of both two methods, two possible reasons for the large discrepancy between the results of two methods are discovered. The first one is that the 10 profiles token by image-based method cannot be assured to be the exact same profiles scanned by the LTS, although the authors try to make sure the identity adjacent profile spacing. The second reason is that blunders exist in the results of both methods. Although large discrepancies between the MPDs from two methods exist, the average MPDs from both methods were relatively consistent. Furthermore, the impact of the large discrepancies between MPDs at each spot on the final average MPD of target road can be largely reduced by increasing the number of testing spots among the target road, which is discussed below.

The MPDs at the three road sites were collected by LTS on the date of the HFST construction, the summarized results for which are shown in Table 9. According to ASTM E1845, the average MPD measured construction date reflects the macrotexture of the HFST pavement right after construction, which was 2.075 mm, 1.590 mm, and 1.860 mm respectively for roadways #1, #2, and #3. Several months later, these three state road sites were revisited and MPDs by LTS and images using iPhone 8 Plus were both collected. Table 9 summarized the average MPD measured by LTS and images for each revisited road sites.

Eleven (11) MPDs by LTS were measured on roadway #1 at the day of construction and the average MPD was 2.075 mm. After 7.7 months, three (3) MPDs by LTS were collected on the same road and their average MPD was 1.315 mm, a 36.63% reduction since construction. During this revisit, a total of sixty-four (64) images were shot as well for these three locations, yielding three 3D point clouds. The average MPD calculated by the image-based method of the present disclosure was 1.393 mm, which was only 5.9%, 0.078 mm, larger than the average MPD by LTS.

As for roadway #2, ten (10) MPDs by LTS were measured on the day of construction and the average MPD was 1.590 mm. After 5.8 months, seven (7) MPDs by LTS were collected at 7 locations on the same road, and the average MPD was 1.259 mm, a 20.82% reduction since construction. A total of 290 images were shot at 10 spots on SR 446 on the revisit, yielding ten (10) 3D point clouds. Spot 5, 6 and 7 had a larger than 15% difference between MPDs by two methods, while the average MPD calculated by the image-based method of the present disclosure was 1.302 mm which was only 3.4%, 0.043 mm, larger than average MPD by LTS.

As for roadway #3, eleven (11) MPDs by LTS were measured on the day of construction and the average MPD was 1.860 mm. After 5.8 months, twelve (12) MPDs by LTS were collected at 12 spots on the same road, and the average MPD was 1.243 mm, a 33.17% reduction. A total of 306 images were shot at 12 spots, among which spot 6, 9 and 11 had a larger than 15% difference of MPDs between the two methods, whereas the average MPD calculated by the image-based method of the present disclosure was 1.235 mm, which was only 0.4%, 0.008 mm, smaller than average MPD by LTS.

Those having ordinary skill in the art will recognize that numerous modifications can be made to the specific implementations described above. The implementations should not be limited to the particular limitations described. Other implementations may be possible.

The invention claimed is:
1. A method of determining macrotexture of an object, comprising:
    obtaining a plurality of stereo images from an object collected from a plurality of angles by an imaging device;
    generating a local coordinate system for each image of the plurality of stereo images;
    detecting one or more local keypoints each having a local coordinate in each image of the plurality of stereo images;
    generating a global coordinate system based on a plurality of ground control points (GCPs) with apriori position knowledge of each of the plurality of GCPs;
    transforming the one or more local keypoints in each image of the plurality of stereo images to one or more global keypoints each having a global coordinate;
    generating a sparse point cloud based on the one or more global keypoints;
    reconstructing a 3D dense point cloud of the object based on the generated sparse point cloud and based on neighboring pixels of each of the one or more local keypoints and calculating the global coordinates of each pixel of the 3D dense point cloud;
    obtaining the macrotexture based on the reconstructed 3D dense point cloud of the object;
    dividing the 3D dense point cloud into a plurality of segments based on a first predetermined distance criterion;
    subdividing each divided segment of the plurality of segments into a plurality of subdivided segments based on a second predetermined distance criterion;

TABLE 9

Summary of the MPD of three road sites by LTS and images for the three roadways

| | On Construction | | | After Construction | | | | Diff. of |
|---|---|---|---|---|---|---|---|---|
| | LTS | | | LTS | | | Image | |
| Road-way | # of spots | Avg. MPD (mm) | Months after | # of spots | Avg. MPD (mm) | Reduction (%) | # of spots | Avg. MPD (mm) | avg. MPD (%) |
| #1 | 11 | 2.075 | 7.7 | 3 | 1.315 | 36.63 | 3 | 1.393 | 5.9 |
| #2 | 10 | 1.590 | 5.8 | 7 | 1.259 | 20.82 | 10 | 1.302 | 3.4 |
| #3 | 11 | 1.860 | 5.8 | 12 | 1.243 | 33.17 | 12 | 1.235 | −0.4 | obtaining an average of peaks and valleys for each segment of the plurality of segments;

determining the maximum peak in each subdivided segment of the plurality of subdivided segments of each segment of the plurality of segments;

obtaining a mean segment depth by averaging the maximum peaks for each subdivided segment of the plurality of subdivided segments of each segment of the plurality of segments; and obtaining a mean profile depth of the object by averaging the mean segment depths for each segment of the plurality of segments.

2. The method of claim 1, wherein each two consecutive images of the plurality of stereo images have an overlap of between about 70% to about 100%.

3. The method of claim 2, wherein the neighboring pixels of each of the one or more local keypoints are selected based on a predetermined number of pixel surrounding the one or more local keypoints.

4. The method of claim 3, wherein the global coordinates of each of the neighboring pixels are averaged and assigned a value for an associated point in the 3D dense point cloud.

5. The method of claim 1, wherein the object is a pavement.

6. The method of claim 1, wherein the imaging device is a smartphone.

7. The method of claim 1, wherein the step of detecting the one or more keypoints in the plurality of images is by i) identifying a pixel with disparate pixel characteristics as compared to neighboring pixels according to a predetermined threshold, and ii) matching pixel attributes between the one or more keypoints on each image of the plurality of stereo images.

8. The method of claim 1, wherein the step of generating the sparse point cloud includes estimating interior and exterior orientation parameters for each camera position of the plurality of angles based on relative position and orientation of each camera of the plurality of cameras to the object.

9. The method of claim 1, wherein the first distance criterion is based on dividing the 3D dense point cloud into a predetermined equally divided segments.

10. The method of claim 9, wherein the predetermined equally divided segments is about 10.

11. The method of claim 1, wherein the second distance criterion is based on dividing each segment into an equally long subdivided segment.

12. A method of determining macrotexture of an object, comprising:

obtaining a plurality of stereo images from an object collected from a plurality of angles by an imaging device;

generating a local coordinate system for each image of the plurality of stereo images;

detecting one or more local keypoints each having a local coordinate in each image of the plurality of stereo images;

generating a global coordinate system based on a plurality of ground control points (GCPs) with apriori position knowledge of each of the plurality of GCPs;

transforming the one or more local keypoints in each image of the plurality of stereo images to one or more global keypoints each having a global coordinate;

generating a sparse point cloud based on the one or more global keypoints;

reconstructing a 3D dense point cloud of the object based on the generated sparse point cloud and based on neighboring pixels of each of the one or more local keypoints and calculating the global coordinates of each pixel of the 3D dense point cloud; and obtaining the macrotexture based on the reconstructed 3D dense point cloud of the object;

wherein each two consecutive images of the plurality of stereo images have an overlap of between about 70% to about 100%, wherein the neighboring pixels of each of the one or more local keypoints are selected based on a predetermined number of pixel surrounding the one or more local keypoints, and wherein the global coordinates of each of the neighboring pixels are averaged and assigned a value for an associated point in the 3D dense point cloud.

13. The method of claim 12, further comprising:

dividing the 3D dense point cloud into a plurality of segments based on a first predetermined distance criterion;

subdividing each divided segment of the plurality of segments into a plurality of subdivided segments based on a second predetermined distance criterion;

obtaining an average of peaks and valleys for each segment of the plurality of segments;

determining the maximum peak in each subdivided segment of the plurality of subdivided segments of each segment of the plurality of segments;

obtaining a mean segment depth by averaging the maximum peaks for each subdivided segment of the plurality of subdivided segments of each segment of the plurality of segments; and obtaining a mean profile depth of the object by averaging the mean segment depths for each segment of the plurality of segments.

14. The method of claim 12, wherein the object is a pavement.

15. The method of claim 12, wherein the imaging device is a smartphone.

16. The method of claim 12, wherein the step of detecting the one or more keypoints in the plurality of images is by i) identifying a pixel with disparate pixel characteristics as compared to neighboring pixels according to a predetermined threshold, and ii) matching pixel attributes between the one or more keypoints on each image of the plurality of stereo images.

17. The method of claim 12, wherein the step of generating the sparse point cloud includes estimating interior and exterior orientation parameters for each camera position of the plurality of angles based on relative position and orientation of each camera of the plurality of cameras to the object.

18. The method of claim 13, wherein the first distance criterion is based on dividing the 3D dense point cloud into a predetermined equally divided segments.

19. The method of claim 18, wherein the predetermined equally divided segments is about 10.

20. The method of claim 13, wherein the second distance criterion is based on dividing each segment into an equally long subdivided segment.

* * * * *